J. McLAUGHLIN.
RESILIENT VEHICLE WHEEL.
APPLICATION FILED AUG. 26, 1918.

1,426,582.

Patented Aug. 22, 1922.

Witness
Chas. D. Sidley

Inventor
Joseph McLaughlin

By Charles E. Wisner
Attorney

UNITED STATES PATENT OFFICE.

JOSEPH McLAUGHLIN, OF FORDWICH, ONTARIO, CANADA.

RESILIENT VEHICLE WHEEL.

1,426,582.  Specification of Letters Patent.  Patented Aug. 22, 1922.

Application filed August 26, 1918. Serial No. 251,387.

*To all whom it may concern:*

Be it known that I, JOSEPH MCLAUGHLIN, a subject of the King of Great Britain, residing at Fordwich, county of Huron, Province of Ontario, Canada, have invented a certain new and useful Improvement in Resilient Vehicle Wheels, and declare the following to be a full, clear, and exact description of the same, such as will enable others skilled in the art to which it pertains to make and use the same, reference being had to the accompanying drawings, which form a part of this specification.

This invention relates to improvements in resilient vehicle wheels and is a continuation as to all common subject matter, of U. S. application No. 67,448, filed December 17, 1915. The invention consists of a novel construction and arrangement of parts providing a plurality of radially disposed spring restrained plungers within the wheel rim, normally in engagement with the central hub member, whereby the wheel rim may float relative to the hub. The new and novel features of the invention reside in the construction of a hub member with oppositely disposed discs on opposite ends thereof and a second pair of discs peripherally engaging the inner circle of the wheel rim, the second discs being overlapped by the two first named discs and shielding the resilient members and operative parts from dirt. Further novel feature of the invention is involved in the construction of the plungers and spring receptacles and the particular construction of the members supporting the plungers, and further in the provision of a novel driving member between the wheel rim and the discs connected with the hub, the general object being to provide a resilient vehicle wheel that is light in weight and comparatively simple and inexpensive in construction, whereby the usual inflatable tire may be dispensed with.

These several features and other objects of the invention are hereinafter more fully described and claimed and shown in the accompanying drawings in which—

Figure 4:
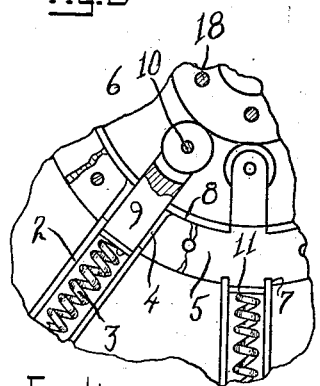
Fig. 4 is an enlarged detail figure showing the plunger and construction of the supporting parts therefor.
Figure 5:
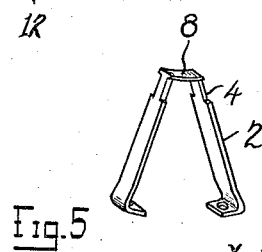
Fig. 5 is a detail in perspective of the bracket utilized in forming the spring and plunger receptacles.
Figure 10:
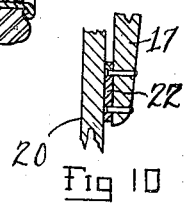
Fig. 10 is a detail showing a means preventing the entrance of dust or dirt to the interior of the wheel.
Figure 6:
Fig. 6 is a detail in perspective of one of the plungers.
Figure 7:
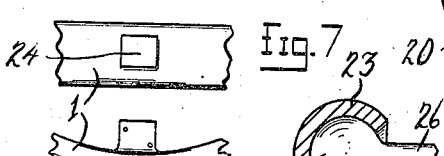
Fig. 7 is a plan view of part of the rim.

The wheel rim 1 has secured to the inner surface thereof a series of V shaped brackets 2 indicated in detail in Fig. 5. These brackets are formed of flat metal strips and extend toward the center of the wheel with the leg of one bracket parallel with the leg of the adjacent bracket, the two legs thus providing receptacles for coiled spring 3. The outer ends of the legs are inwardly turned and secured to the rim. The inner end of each bracket on opposite sides thereof is notched as indicated at 4 in Fig. 5, and these notches on the assembled brackets provide a recess for the ring member 5. There is thus a ring member on opposite sides of the brackets and the brackets are held firmly at the inner ends by these rings which are bolted together by the bolts 6 extending between the legs of each bracket. The rings are notched as will be understood from Fig. 4 at 7 for each leg of each bracket and on the inner circumferential side the ring is notched to receive the cross member 8 of each bracket. By this construction the inner ends of the brackets are firmly held in position and the assembled rings and brackets provide a rectangular open ended receptacle within which the rectangular plunger 9 may reciprocate. The plunger 9 is indicated in detail in Fig. 6 and is provided at the inner end with a roller 10 and the outer end is provided with a flange 11 on opposite sides which normally engages the outer edges of the two oppositely disposed ring members limiting inward movement of the plunger. Springs bear against the plunger at one end and the opposite end bears against a block 12 inserted between the parallel legs of the brackets 2 as will be understood from the Fig. 2.

Figure 3:
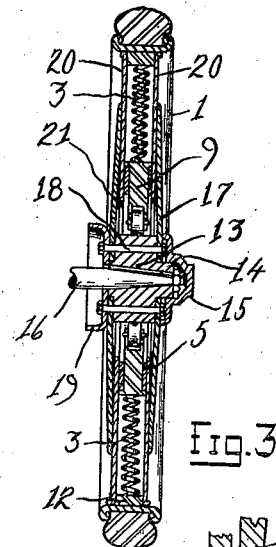
Fig. 3 is a section taken on the line *x—x* of Fig. 1, showing the discs in position and method of connection of the inner discs with the hub member.

The wheel is provided with a hub 13 which may be of any approved type preferably having a threaded extension 14 to receive the cap 15. The spindle of the axle 16, in a driving wheel is carried in this hub member 13. The opposite ends of the hub member are adapted to have secured thereto dished central plates 17 extending outward toward the rim as will be understood from Fig. 3. These discs or plates are bolted to the hub by means of bolts 18, the bolts passing through both the disc members 17 and, in case of the driving wheel, are adapted to secure the brake band 19 in position. The cap member 15 is provided with a circumferential flange which covers the ends of the bolts as is shown in Fig. 3 providing a wheel of neat appearance. There is a second pair of discs 20 on opposite sides of the wheel having a comparatively large central opening 21 through which the hub member projects and these discs or plates 20 are of a diameter to fit the inner circumference of the wheel 1, but are not necessarily attached thereto. These discs 20 lie in contact with the edges of the bracket members 2 and provide therewith a closed receptacle for the spring members 3. The inner discs 17 are preferably provided at or near the periphery and around the inside face of the disc with a packing member 22 closing the interstice between the discs 20 and 17 to prevent dirt from passing into the interior of the wheel. The discs, however, are not connected allowing the rim and the discs 20 and brackets to freely move toward or from the hub member 13.

Figure 2:
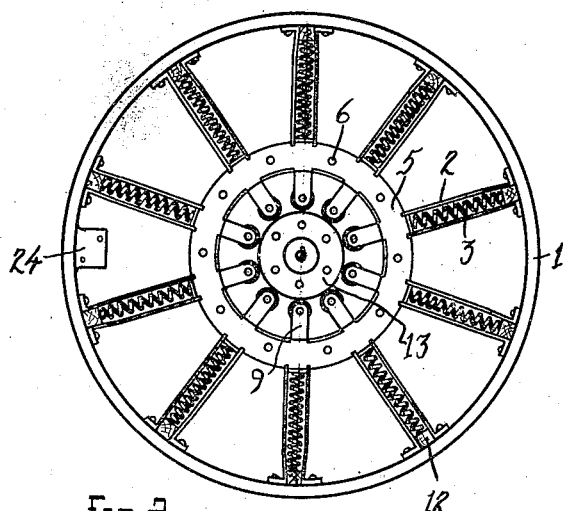
Fig. 2 is a side view of the wheel with the plates removed.

The surface of the hub member 13 is round as shown and the rollers 10 of the plungers 9 normally contact the hub member yieldably positioning the hub centrally of the wheel rim as shown in Fig. 2. Upon meeting an obstruction the rim may yield and move eccentrically to the hub member to relieve the wheel and vehicle of road shock.

Figure 1:
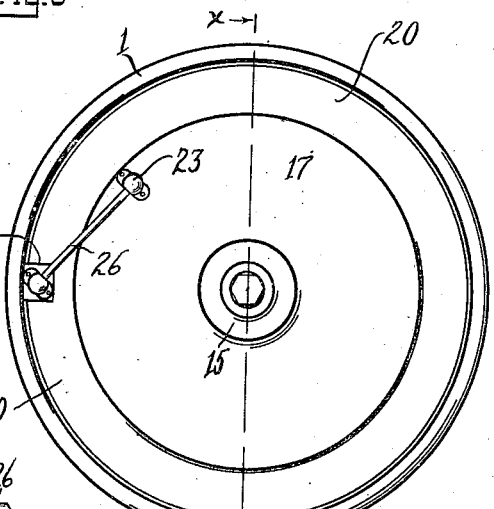
Fig. 1 is a side elevation of a wheel embodying my invention.
Figures 8, 9:
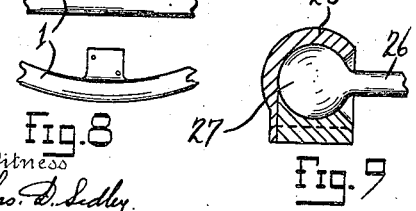
Fig. 8 is a side view of Fig. 7.
Fig. 9 is a vertical section of the socket used at each end of the driving connection between the rim and disc on the hub.

From the above description it may be seen that the inner disc members 17, being bolted to the hub, necessarily rotate therewith and a means is provided whereby the rotation of the said discs and hub member produce rotation of the rim therewith while allowing movement of the rim toward and from the hub in the manner described. For this purpose either or both the disc members 17 may be provided with a socket 23. This socket may be of any approved type as for instance as is shown in Fig. 9, and a similar socket secured to the rim. For this purpose the rim is provided with a block 24 to which the socket 23 may be secured. Also the discs or plates 20 are notched as indicated at 25 to engage over the block as shown in Fig. 1, and allow the socket to be secured thereto from the outside of the wheel. Connecting the two sockets is a bar 26 provided at each end with a ball 27 engaging in the sockets respectively. By this connection, rotation of the disc 17 and hub member 13 causes rotation of the rim therewith and by reason of the ball and socket connection allows freedom of movement of the wheel rim eccentrically relative to the hub. As was stated heretofore, the wheel may be provided with the pivoted driving connection on both sides or upon only one side as desired.

From the foregoing description it is evident that, by use of the brackets and ring members, the wheel is comparatively light in weight inasmuch as castings providing the spring receptacles and integral central hub members commonly employed are dispensed with and yet a construction is secured that is amply strong for the purpose while light in weight. For the purpose of lightness the disc members 20 may be made of quite thin metal inasmuch as they are subjected to little or no strain and the hub member 13 (although not here shown) may be hollowed out between the bolt members 18 to secure lightness in weight.

Having thus fully described my invention what I claim and desire to secure by Letters Patent of the United States is—

1. In a vehicle wheel a rim, a plurality of V shaped brackets secured to the rim and extending inward therefrom, the legs of adjacent brackets lying in parallel relation, a pair of ring members secured to each side of the brackets at the inner ends, the said rings and said legs of adjacent V shaped members providing a substantially rectangular receptacle, a plunger mounted in each receptacle, means limiting the extent of inward movement of the plunger, a spring in the receptacle formed between the legs of the brackets engaging the plunger, a hub supported by the inner ends of the plungers, and driving connection between the rim and hub.

2. In a wheel a rim, a plurality of V shaped brackets secured to the rim and extending inwardly therefrom, the legs of adjacent brackets lying in parallel relation, a ring shaped member secured to each side of the brackets adjacent the inner ends, the brackets being notched to receive the rings, the outer surfaces of which are practically flush with the edges of the brackets, a plunger reciprocable in the receptacle formed between the rings and bracket ends, the plunger having flanges normally engaging against the rings, a coiled spring between each of the said parallel legs of the brackets holding the plungers in normal position, rollers carried in the inner edge of the plungers, and a hub centrally positioned by the plungers.

3. In a vehicle wheel, a rim, a plurality of V shaped brackets formed of flat metal strips having the ends thereof inwardly turned and secured to the rim, the brackets extending inwardly from the rim and the legs of adjacent brackets being notched on opposite sides, a pair of ring members secured in the notches respectively and being bolted together providing a stiffening member for the brackets and combining therewith at the end to form an open end receptacle, a plunger in each of said receptacles having a roller at the inner end and having oppositely disposed flanges at the opposite end normally engaging the outer edges of the ring members, the edges of the flanges being flush with the outer faces of the rings and edges of the brackets, a circular plate on each side of the rim contacting the edges of the brackets and providing with the brackets, a closed receptacle, a spring in each of said receptacles engaging the plunger and normally holding it in contact with the ring members, a hub member centrally positioned by the yieldable plungers, a pair of plates secured to the hub member and overlapping the first named plates, and a driving connection between the last named plate and the rim.

In testimony whereof, I sign this specification.

JOSEPH McLAUGHLIN.